(12) United States Patent
Routledge

(10) Patent No.: US 7,430,959 B2
(45) Date of Patent: Oct. 7, 2008

(54) DEVICE FOR LIFTING BALE WRAPPING ROLLS

(76) Inventor: Elgin Routledge, Box 2339, Virden, Manitoba (CA) R0M 2C0

( * ) Notice: Subject to any disclaimer, the term of this patent is extended or adjusted under 35 U.S.C. 154(b) by 0 days.

(21) Appl. No.: 11/942,938

(22) Filed: Nov. 20, 2007

(65) Prior Publication Data

US 2008/0121119 A1    May 29, 2008

Related U.S. Application Data

(60) Provisional application No. 60/867,117, filed on Nov. 23, 2006.

(51) Int. Cl.
*B65B 41/00* (2006.01)
*B65B 63/04* (2006.01)
*B30B 5/06* (2006.01)

(52) U.S. Cl. .............................. 100/87; 100/88; 56/341; 53/211; 53/389.2; 53/587; 53/118

(58) Field of Classification Search .................. 100/87, 100/88, 89; 56/341; 53/118, 211, 389.1, 53/389.2, 389.4, 587

See application file for complete search history.

(56) References Cited

U.S. PATENT DOCUMENTS

| 4,062,461 | A | * | 12/1977 | Vincent | ..................... 414/24.5 |
| 4,621,741 | A | * | 11/1986 | Boon | ......................... 212/175 |
| 4,691,503 | A | * | 9/1987 | Frerich | ......................... 53/587 |
| 5,979,141 | A | | 11/1999 | Phillips | |
| 5,996,307 | A | | 12/1999 | Niemerg | |
| 6,272,816 | B1 | | 8/2001 | Viaud | |
| 7,322,167 | B2 | * | 1/2008 | Chapon et al. | ............. 53/389.2 |

\* cited by examiner

*Primary Examiner*—Jimmy T Nguyen
(74) *Attorney, Agent, or Firm*—Adrian D. Battison; Ade & Company Inc.

(57) ABSTRACT

A baler is modified to include a device for lifting rolls of bale wrapping material into the baler where the lifting device includes a winch having a frame and a guide arranged to be mounted on the housing of the baler at a rear wall thereof above a cover member over the roll compartment. A cable extends from the pulley through an opening in the cover such that, with the cover member opened, the cable passes through the opening in the cover member to pass through the compartment to the ground below the compartment. An element such as a hook or a grapple is carried on the cable for lifting a roll of the wrapping material by the winch into the compartment.

7 Claims, 3 Drawing Sheets

DEVICE FOR LIFTING BALE WRAPPING ROLLS

This application claims priority under 35 U.S.C. 119 from U.S. Provisional Application Ser. No. 60/867,117 filed Nov. 23, 2006.

This invention relates to a device for lifting rolls of bale wrapping material into a storage position on a baler.

BACKGROUND OF THE INVENTION

John Deere in their U.S. Pat. Nos. 5,979,141 (Phillips) issued Nov. 9, 1999 and 6,272,816 (Viaud) issued Aug. 14, 2001 disclose details of their baler and in particular the storage compartment at the rear of the housing of the baler which contains a rolled supply of wrapping material so as to wrap the cylindrical bale around its peripheral surface when the baling process is finished.

Balers of this type are widely used and the requirement for wrapping the bale has become more important in recent years and is becoming more widely accepted in order to maintain a better quality of the bale when handled and stored.

These two patents disclose some arrangements mounted within the compartment for assisting in lifting the rolls into the compartment. Within the compartment there is a lower receptacle for the roll of material which is in use together with another receptacle for a back-up roll to be moved into the first receptacle when the first roll finished. The storage receptacle is at a height of the order of 5 to 6 feet from the ground so that there is some difficulty in lifting the roll into that location. The rolls commonly weight of the order of 80 to 100 lbs and are somewhat unwieldy so that manual lifting is difficult.

While the above patents show devices within the compartment for assisting the lifting into the receptacle, commonly such balers are sold without a lifting device, leaving the farmer to manually introduce the rolled material.

U.S. Pat. No. 5,996,307 (Niemerg) issued Dec. 7, 1999 to Claas discloses a lifting device which is mounted on a side wall of the baler and pivots from a position in which the roll is laid in the device to a position in which the roll is inserted along its axis across the baler into the receptacle at the rear of the housing.

American Brazilian Company under the trade mark Ambraco sell a carry handle arrangement for carrying rolls of bale wrap material where the handles include a manually graspable handle part attached to a strap which wraps around the roll. This allows the roll to be lifted manually more easily but does not assist in lifting the roll into the baler to the raised height required which must still be done by manual effort.

SUMMARY OF THE INVENTION

It is one object of the invention to provide a lifting device for lifting rolls of bale wrapping material into a baler.

According to one aspect of the invention there is provided a device for lifting rolls of bale wrapping material into a baler, where the baler comprises:

a baler housing mounted on ground wheels for movement over the ground;

a compartment at the rear of the baler housing for containing a supply of a wrapping material so be supplied to and wrapped around a bale when competed;

the compartment having a cover member pivotally mounted on the baler housing for pivotal movement from a closed position covering the compartment to an open raised position about and axis across a top of the cover member;

the device comprising:

a winch having a frame and a guide arranged to be mounted on the housing at a rear wall thereof above the cover member;

an opening through the cover member;

a cable arranged to extend from the pulley through the opening such that with the cover member opened the cable passes through the opening in the cover member to pass through the compartment to the ground below the compartment;

and an element carried on the cable for lifting a roll of the wrapping material by the winch into the compartment.

Preferably the opening in the cover member is located in a center of a rear portion which is horizontal in the open position.

Preferably the frame includes a rearwardly projecting portion extending rearwardly from the winch and from the rear wall of the housing with the guide mounted at the rear of the portion.

Preferably the guide mounted at the rear of the portion comprises a ring through which the cable passes.

Preferably the opening in the cover member includes a guide ring.

Preferably the element for lifting comprises a grapple for engaging the roll. The grapple can be any element which engages the roll and it may engage the roll by grasping around the roll.

Alternatively the element for lifting may comprise a hook or similar element which engages a lifting device attached to the roll. For example the hook may engage one of a pair of handles of the type manufactured by Ambraco as mentioned above.

Preferably the grapple includes two pairs of arms which are arranged at positions spaced along the roll, each pair being curved so as to extend partly around the roll and each pair being pivotal so as to move apart to pass around the roll and together so as to enclose the roll.

Preferably the grapple arms are pivotal by a manually operable lever.

BRIEF DESCRIPTION OF THE DRAWINGS

One embodiment of the invention will now be described in conjunction with the accompanying drawings in which.

The disclosure of the two Deere patents is incorporated herein by reference to provide such information concerning the structure of the baler.

DETAILED DESCRIPTION

Figure 1:
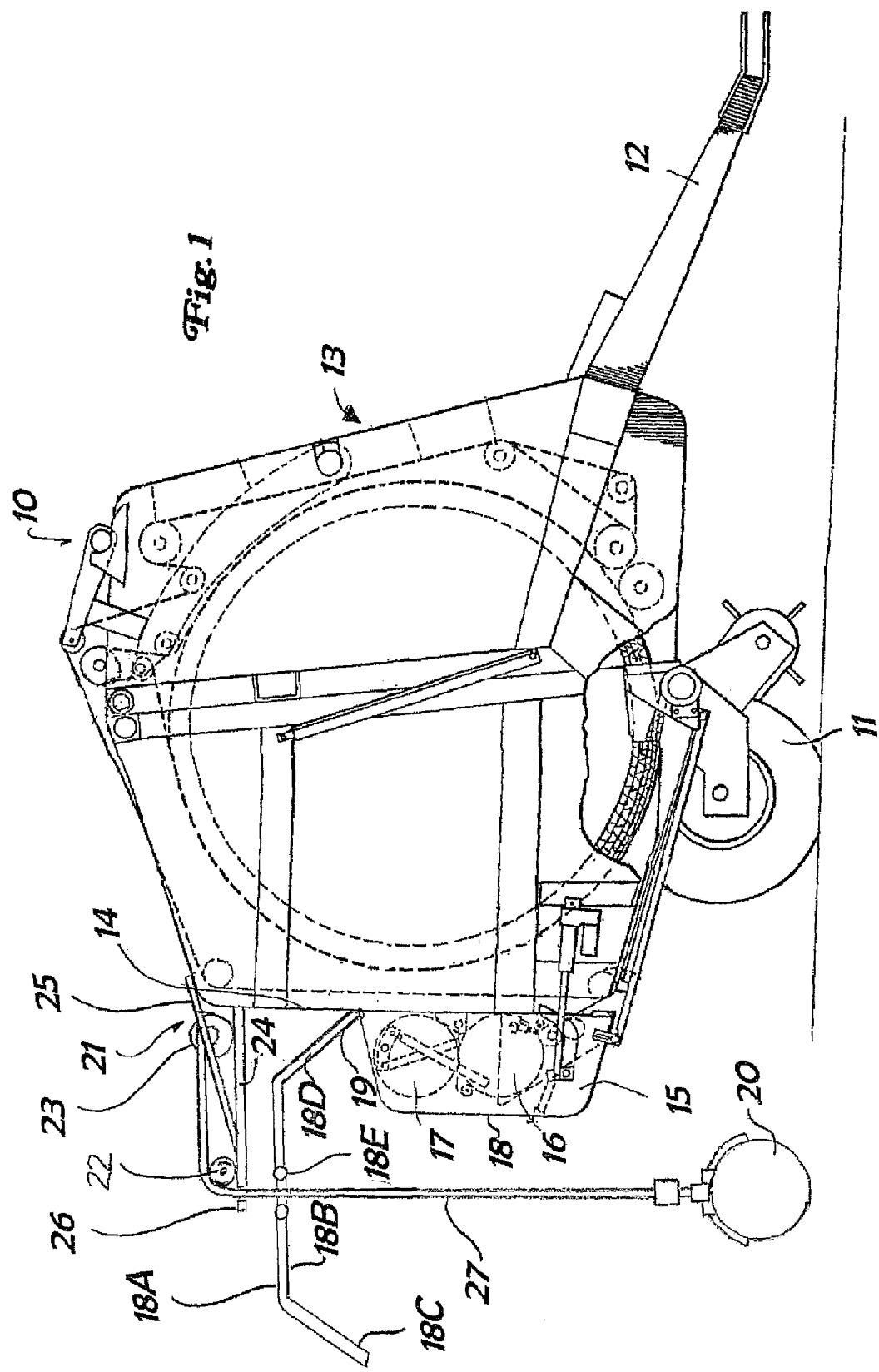
FIG. 1 is a side elevational view of a baler including a lifting device according to the present invention. The figure is taken from U.S. Pat. No. 5,979,141 listed above and is modified to include the lifting device of the present invention.

In FIG. 1 is shown a baler 10 mounted on ground wheels 11 to be towed by a hitch 12 over the ground for carrying out a baling action. The baler includes a housing generally indicated at 13 which contains the baling elements.

The construction and operation of the baler itself is well known from many previous patents.

At the rear of the housing on a vertical rear wall 14 of the housing is mounted a compartment 15 for containing the roll of wrapping material to be supplied into the baler when the baling action is complete. The compartment includes a lower receptacle 16 for receiving the roll in operation and an upper storage receptacle 17 for receiving a back-up roll to be moved into place when the operating roll is completed.

The compartment 15 includes a cover panel 18 hinged at an upper edge 19 so that it can be pivoted from the closed position enclosing the compartment to a raised position indicated at 18A.

The lifting mechanism for raising the roll 20 from the ground or from another supply vehicle into one of the receptacles 16 or 17 is shown in FIG. 1. The device comprises a frame 21 mounted at the upper rear part of the rear wall 14 of the housing so as to project out over the compartment 15 and the cover 18. The frame carries a pulley 22 and a winch 23. The winch is located at the rear wall 14 and the pulley is cantilevered out over the compartment on a base arm 24 and a pair of support braces 25. The pulley is mounted on the outer end of the base arm and the base arm includes a guide 26 so that the cable 27 passes from the winch over the pulley and through an opening in the guide 26.

The cover 18 has a horizontal central portion 18B in the raised position with two depending portions 18C and 18D extending downwardly from the horizontal portion 18B. A guide ring 18E is provided in the horizontal cover portion 18B defining a hole approximately at the center thereof and arranged so that the cable can descend from the guide 26 downwardly through the opening through the guide ring 18E in the cover to the ground passing in front of the compartment. The guide ring is located in the cover so as to be suitably located to carry the cable to a position adjacent the compartments 16 and 17 so that the roll can be simply pushed rearwardly with very little force into the receptacles.

Figure 2:
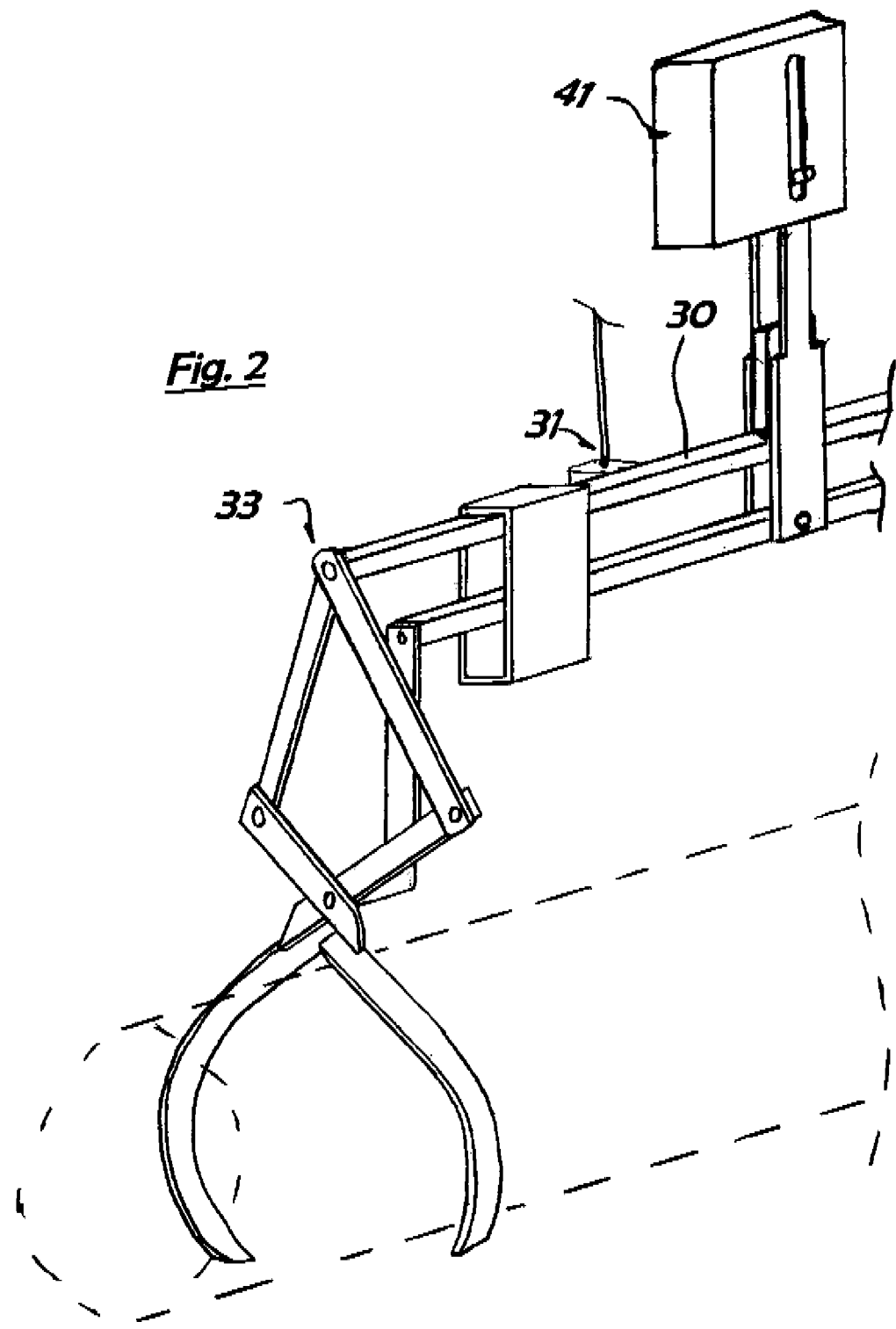
FIG. 2 is an isometric view from one end of the grapple of the lifting device of FIG. 1.
Figure 3:
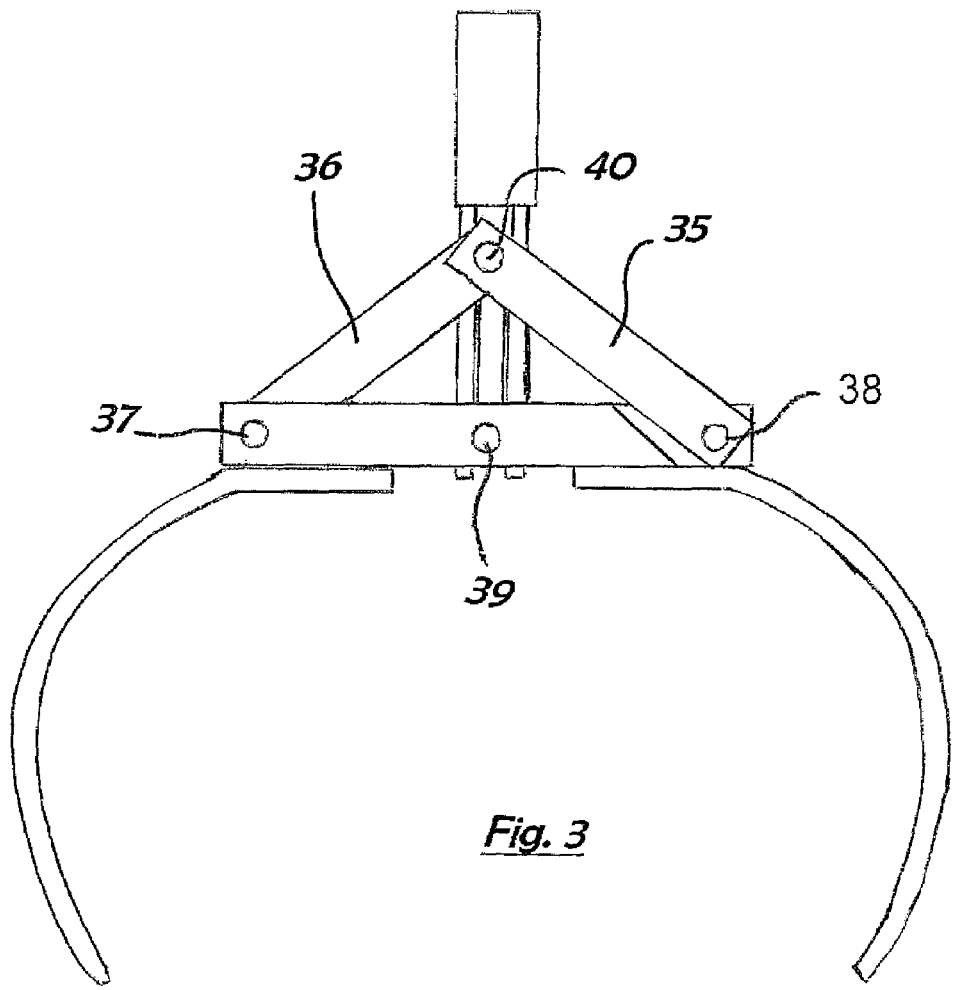
FIG. 3 is an isometric view from one side of the grapple of the lifting device of FIG. 1.

The grapple of FIG. 2 includes a horizontal frame 30 attached to a link 31 carried on the end of the cable. The horizontal frame defines at each end a pair of grapple arms including a first pair (not shown) at one end and second pair 33 at the other end. The arms curve around the roll and can be pivoted from an outer position to a clamped position. This movement is effected by links 35 and 36 which push the grapple arms so as to pivot about pivot pins 37 and 38 by forcing apart a lower link pin 39 and an upper link pin 40. This movement is effected by a manually operable lever 41 carried on the frame 30.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A baler including a device for lifting rolls of bale wrapping material into the baler, comprising:
   a baler housing mounted on ground wheels for movement over the ground;
   a compartment at the rear of the baler housing for containing a supply of a wrapping material to be supplied to and wrapped around a bale when completed;
   the compartment having a cover member pivotally mounted on the baler housing for pivotal movement from a closed position covering the compartment to an open raised position about an axis across a top of the cover member;
   the device comprising:
   a base arm mounted at an upper rear part of a rear wall of the baler housing, the base arm positioned above the cover member, and the base arm includes a guide;
   a winch and a pulley are positioned on the base arm;
   an opening through the cover member;
   a cable arranged to extend from the winch over the pulley through the guide and through the opening in the cover member such that with the cover member opened the cable passes through the opening in the cover member to pass through the compartment to the ground below the compartment;
   and an element carried on the cable for lifting a roll of the wrapping material by the winch into the compartment.

2. The baler according to claim 1 wherein the opening in the cover member is located in a center of a rear portion which is horizontal in the open position.

3. The baler according to claim 1 wherein the frame includes a rearwardly projecting portion extending rearwardly from the winch and from the rear wall of the housing with the guide mounted at the rear of the portion.

4. The baler according to claim 1 wherein the opening in the cover member includes a guide ring.

5. The baler according to claim 1 wherein the element for lifting comprises a grapple for engaging the roll.

6. The baler according to claim 5 wherein the grapple includes two pairs of arms which are arranged at positions spaced along the roll, each pair being curved so as to extend partly around the roll and each pair being pivotal so as to move apart to pass around the roll and together so as to enclose the roll.

7. The baler according to claim 6 wherein the grapple arms are pivotal by a manually operable lever.

* * * * *